Sept. 2, 1969  G. R. MARNER  3,465,339
METHOD AND MEANS FOR DETECTING AIR TURBULENCE
Filed Oct. 22, 1965  5 Sheets-Sheet 1

INVENTOR.
GENE R. MARNER
BY *Moody & Hallacher*
ATTORNEYS

| ANTENNA TEMPERATURE CONTRIBUTION | | WAVELENGTH (MM) | | | | |
|---|---|---|---|---|---|---|
| | | 5.6 | 5.7 | 5.8 | 5.9 | 6.0 |
| AIR BETWEEN ANTENNA AND TURBULENT REGION | $T_{a1}$ | 211.2 | 163.5 | 132.0 | 108.2 | 90.2 |
| TURBULENT REGION | $T_{a2}$ | 9.0 | 53.5 | 74.2 | 82.5 | 83.8 |
| BEYOND TURBULENT REGION | $T_{a3}$ | — | 4.2 | 15.4 | 30.0 | 44.4 |
| ANTENNA TEMPERATURE | | 220.2 | 221.2 | 221.6 | 220.7 | 218.4 |
| NOMINAL AIR | | 220.0 | 220.0 | 219.9 | 219.0 | 216.8 |
| DIFFERENCE | | 0.2 | 1.2 | 1.7 | 1.7 | 1.6 |

INVENTOR.
GENE R. MARNER
BY
ATTORNEYS

United States Patent Office 3,465,339
Patented Sept. 2, 1969

3,465,339
METHOD AND MEANS FOR DETECTING
AIR TURBULENCE
Gene R. Marner, Marion, Iowa, assignor to Collins Radio Company, Cedar Rapids, Iowa, a corporation of Iowa
Filed Oct. 22, 1965, Ser. No. 500,682
Int. Cl. H04b 7/00
U.S. Cl. 343—100          13 Claims

ABSTRACT OF THE DISCLOSURE

Disclosed is a system which utilizes the natural microwave radiation emitted by regions of elevated or depressed air temperature to remotely detect such regions. The invention includes a radiometric receiver capable of detecting the temperature changes caused by such regions and a filtering system capable of determining the temperature differential between the turbulent regions and the ambient air. The output of the filtering system is passed to an indicator where it is translated into useful information. Because the temperature differential results in a change in the frequency of the radiation emitted by the turbulent region, the system detects frequencies lying on either side of the frequency emitted by the ambient temperature.

---

This invention relates generally to radiation detection means and particularly to a system for detecting clear air turbulence by reception of the radiation given off by such regions.

As the widespread use of jet passenger aircraft has developed it has become evident that there are many instances in which turbulence is encountered which is not directly associated with cumulus clouds or thunderstorms. This turbulence, frequently termed clear air turbulence, gives little or no visual or radar indication of its presence and therefore causes considerable difficulty in aircraft operation. The most common usage of the expression "clear air turbulence" refers to all forms of turbulence which give little or no radar return. Clouds may be present in the turbulent region, or in the region between the aircraft and the turbulent region. A number of cases of injury to passengers, damage to aircraft structure, and complete loss of aircraft have officially been ascribed to clear air turbulence. The need to detect such turbulence several miles beforehand, allowing reduction of speed to a suitable turbulence cruising speed and permitting warning to passengers, or changing course, is therefore quite evident.

While there appear to be several causes of clear air turbulence, upward deflection of air by mountain slopes, convective processes, vertical wind shear in portions of jet streams, etc., it is also understood that horizontal temperature gradients normally exist at the boundaries of the turbulent regions. That is, the turbulent regions appear to be several degrees cooler or warmer than the surrounding air. Although the turbulent regions are sometimes large, the boundary region is normally too narrow to permit both detection and preventative action by the use of outside air thermometers before entering the turbulent region. Difficulty in remote detection of the boundaries of turbulent regions makes it difficult to obtain data as to the shape and size of turbulent regions. Both meteorological considerations and flight experience indicate that the general horizontal extent of turbulent regions is fairly large. Studies indicate that the narrow dimension of the turbulent region in the lower part of the jet stream is typically 50 miles while that of the turbulent region in the upper part of the jet stream is typically 200 miles. The long dimension of this type would be expected to be several hundred nautical miles, with the minimum dimension being about 20 nautical miles. There are instances in which aircraft encounter turbulence for shorter distances. In some cases this may result from smaller regions of turbulence, while in others it may result from a flight path which traverses only a small portion of a larger turbulent region. The chief difficulties experienced by aircraft arise from the more extended exposures to turbulence, so that this invention emphasizes the detection of extended regions of turbulence.

The existence of a substantial temperature difference in clear air turbulent regions gives rise to the ability to detect the turbulent regions remotely with adequate time to take the necessary preventative measures. This ability arises because air emits microwave radiation whose power flux depends upon its attenuation constant and its temperature.

The turbulent region has a temperature different from the ambient temperature. This causes the emission of microwave radiation whose intensity depends on the temperature. Therefore the temperature difference can be detected by receiving the microwave energy with a radiometric receiver.

This invention includes a method of detecting clear air turbulence and an instrument means, which utilizes this natural radiation for the remote detection of regions of elevated or depressed air temperature which are therefore likely to be regions of turbulence.

It is therefore an object of this invention to provide a device which is capable of detecting clear air turbulence.

It is another object of this invention to provide such a device which detects the turbulent region sufficiently in advance of entrance into said region to give advance warning so precautionary measures can be taken.

Still another object is to provide a passive clear air turbulence detector.

Another object of the invention is a method of detecting clear air turbulence based on detecting the radiation of the clear air turbulence.

Still another object is to provide a clear air turbulence detector the operation of which is unaffected by the presence of clouds.

Further objects, features and advantages of the invention will become apparent from the following description and claims when read in view of the accompanying drawings, in which:

Figure 1:
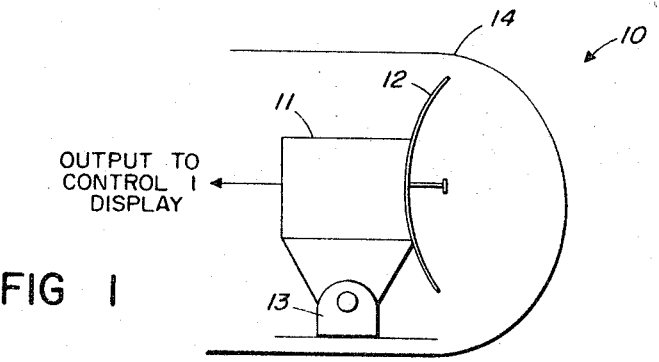
FIGURE 1 shows a generalized view of one embodiment of the invention.

As shown in FIGURE 1, the clear air turbulence detector 10 consists of a radiometric receiver 11 operating in the short microwave region, an antenna 12, stabilized by the stabilization system 13, a radome 14, and a control and display unit not shown. The stabilization system keeps the antenna pointed ahead of the airplane at a predetermined altitude angle near zero—that is, near the horizontal. The shallow vertical extent of the turbulent region and the rapid change of atmospheric temperature and pressure with height require accurate stabilization. Means for making small adjustments in the altitude angle of the antenna must be included in the stabilization system. As the aircraft flies through normal air the radiometric receiver output registers the average air temperature over a distance of a few tens of miles ahead of the aircraft. This output fluctuates in accordance with the noise figure and output averaging time of the receiver. An additional component of the fluctuation can be expected because the air temperature will not normally be precisely homogenous; the average temperature will therefore fluctuate slightly. It will be shown, however, that the presence of a region of turbulent air ahead of the aircraft will cause the receiver output to increase or decrease, and also increase the amplitude of its fluctuation. These changes can be recognized in sufficient time to allow reduction of speed and warning of passengers.

In its simplest form, the stabilization system can be merely a remote manual adjustment in the pitch coordinate of the antenna, the antenna otherwise remaining fixed relative to the air-frame. An extremely stable aircraft is required to permit satisfactory operation of such a stabilization system. A more general case is stabilization about the pitch coordinate. Of course, full three-dimensional stabilization can be used, but in many cases this is not necessary. Any stabilized platform can be used and therefore a detailed description will not be given as it forms no part of this invention. The receiver is a radiometric receiver with excellent figure of merit such as that described in Patent No. 2,519,603. It should be noted that a radiometric receiver is similar to a radar receiver except that it does not have a range gate and is not associated with a transmitter. It has a wide R-F bandwidth and low noise figure to attain an excellent figure of merit. It also has stable power gain. The choice of frequency and the required figure of merit are discussed in more detail hereinafter. The receiver type, calibration means, and presentation system are interrelated and several combinations are satisfactory. Two preferred embodiments are shown in simplified form in FIGURES 2 and 3.

Figure 2:
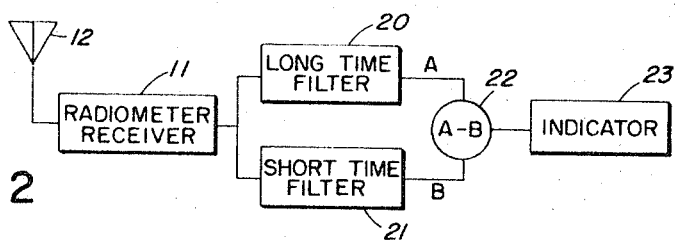
FIGURE 2 shows a preferred embodiment of circuitry which forms a part of the invention.

FIGURE 2 shows a D-C radiometric receiver 11 with the output applied to two low-pass filters in parallel. Filter 20 uses a long time constant such as one or two minutes and filter 21 uses a shorter time constant such as 5 or 10 seconds. Detector 22 senses the difference between these signals when a change in the short-term average value of the receiver 11 output would cause a difference in the two filter outputs A and B. The difference signal A–B is then used to actuate on indicator 23 to indicate a turbulent region ahead.

Figure 3:
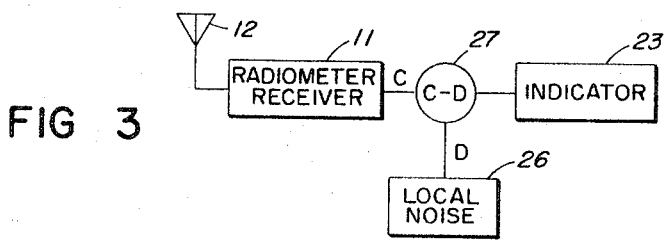
FIGURE 3 shows a second preferred embodiment of circuitry which forms a part of the invention.

FIGURE 3 shows another embodiment of the invention. A radiometric receiver 11 is used in conjunction with a local noise source 26. Local noise source 26 is adjusted to a level such that the normal antenna temperature gives a null output at the output of difference detector 27. A sudden change is then easily recognized by a change in the C–D signal, because of a significant change in the receiver output C. The embodiment of FIGURE 3 can be modified to utilize automatic adjustment of the local noise source to hold the long-term average output nulled. The local noise source adjustment itself becomes the indication of the long-term average antenna temperature, while short term deviations would be registered by a short time constant filter on the receiver output.

Note that both embodiments will furnish an indicator response in two types of operation: (1) the average value of the signal received by the antenna shifts during a time period ranging from a few seconds to a few minutes; (2) in amplitude or period of fluctuations in the received signal change if the period of the fluctuation ranges from a few seconds to a minute or two.

All of the components of both embodiments shown in FIGURES 2 and 3 are well-known in the art and therefore are not described in detail.

PRINCIPLE OF OPERATION

In order to describe the principle of operation a brief outline of the technical background is given. The electromagnetic flux density in the interior of an isothermal cavity with opaque walls is independent of direction and position and depends only upon the temperature of the wall. In the short microwave region, its value per unit bandwidth is proportional to the absolute temperature of the wall if the wall temperature is higher than a few degrees above absolute zero. Under such conditions, an ideal antenna placed inside the enclosure would deliver to a matched receiver the power $$P = kT\Delta f \text{ watts} \quad (1)$$

where $k$ is the Boltzman's constant, $1.38 \times 10^{-23}$ watts (degrees-c.p.s.)$^{-1}$, T is the wall temperature in degrees Kelvin and $\Delta f$ is the receiver predetection bandwidth in c.p.s. If the receiver were replaced by a matched impedance with the same temperature T, the Johnson noise delivered to the receiver would be identical. We therefore define the quantity $P/k\Delta f$ as the antenna temperature $T_a$ which in this simple case is merely the wall temperature T; that is, from (1) we have $$T_a = P/k\Delta f = T \quad (2)$$

Assuming that the antenna is highly directional with negligible spillover we can consider the case in which a substantial portion of the wall is removed. Now the antenna temperature also becomes proportional to the emissivity $\xi$. If the remaining wall fills the entire beam, the antenna temperature is $$T_a = \xi T \quad (3)$$

To calculate the power radiated by the atmosphere it is necessary to extend the above result to the case in which the opaque wall with surface emissivity $\xi$ is replaced by a thin semi-transparent shell of thickness $\xi x$. Assuming for the moment that there is no other source of radiation on either side of this shell, it can be shown by thermodynamic arguments that the effective emissivity of the shell (corresponding to the surface emissivity of the opaque wall) is the fractional power absorption which a plane wave would experience in passage through the shell. Defining the field strength attenuation constant $\alpha$ in the usual manner, $$E = E_0 e^{-\alpha \delta x} \quad (4)$$

where $E_0$ and $E$ are the field strength before and after passage through the shell, we have the power relation $$P = P_0 e^{-2\alpha \delta x} \quad (5)$$

Considering the shell to be sufficiently thin that the exponent is much less than one, we can expand the exponential and, using the first two terms, find that the fractional power absorption is $$\frac{P_0 - P}{P_0} = 1 - e^{-2\alpha \delta x} = 2\alpha \delta x \quad (6)$$

The quantity $2\alpha\delta x$ therefore is to be substituted in the place of the emissivity in Equation 3 if the wall is not opaque. In the actual atmosphere, of course, we do not have a discontinuous shell, but rather a continuous medium with a slowly varying temperature and attenuation constant which can be treated mathematically as an infinite number of adjacent layers of infinitesimal thickness $dx$. Recognizing that the radiation from each layer is attenuated by all of the layers between it and the antenna, we find the antenna temperature due to the atmosphere is $$T_a = 2 \int_0^\infty \alpha(x) T(x) e^{-2\int_0^x \alpha(x')dx'} dx \quad (7)$$

If the attenuation constant is sufficiently high (that is, if the total atmosphere in the direction of observation is opaque) the antenna temperature can be thought of as an average temperature as weighted by the function $$2\alpha(x)e^{-2\int_0^x \alpha(x')dx'}$$

In practice, the attenuation constant is heavily dependent upon the wavelength so that even 1 km. of atmosphere is highly opaque at 5 mm. wavelength, while the entire atmosphere in the vertical direction is nearly transparent at 8.7 mm. wavelength.

It is this variability of the attenuation constant with wavelength which gives the opportunity to sense regions of differing temperature and/or density at some moderate distance. It is possible to choose a wavelength for which the attenuation constant is sufficiently high that the contribution to the integral (6) made by the turbulent region is substantial even when observed from several miles away. One must compromise between the desire to make the attenuation so high that the turbulent region becomes opaque and the desire to choose the attenuation so small that the radiation from the turbulent region suffers little attenuation in traveling several miles. A feasible compromise is obtainable which permits detection at a distance roughly equal to the minimum extent of the turbulent region. To clarify this concept a simple idealized example is given.

Figure 4:
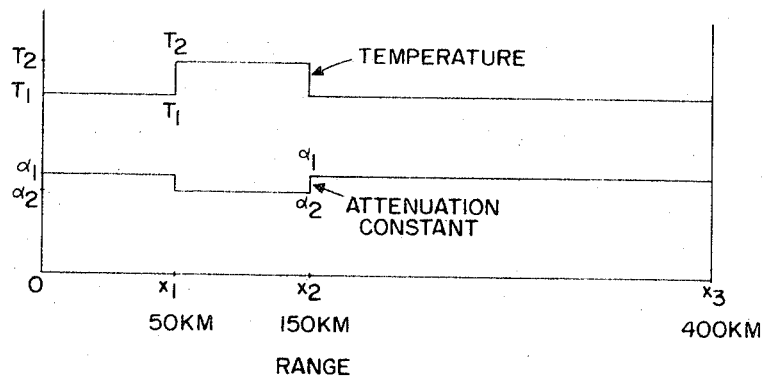
FIGURE 4 shows an idealized presentation illustrating the attenuation constant and temperature variation for an assumed situation.

FIGURE 4 shows a horizontally stratified portion of the atmosphere with constant temperature $T_1$ and constant pressure P. The corresponding attenuation, $\alpha_1$, is therefore independent of the horizontal position. At a distance $x_1$ from the antenna, assume an abrupt increase in temprature to a new value $T_2$ which will continue to the distance $x_2$ from the antenna. The attenuation changes to a new value $\alpha_2$ in this elevated temperature region. (A discussion of the wavelength, pressure, and temperature dependence of the attenuation has been given recently—M. L. Meek, and A. E. Lilley (1963) The Microwave Spectrum of Oxygen in the Earth's Atmosphere, Journal of Geophysical Research, vol. 68, No. 6, pages 1683–1703.) Further assume that the attenuation and temperature abruptly revert to the original values $T_1$ and $\alpha_1$ at the distance $x_2$. At $x_3$ the atmosphere is assumed to end. This finite extent is chosen to simulate the effect of the decrease in atmospheric pressure with height and the curvature of the earth. Under these assumptions the antenna temperature becomes $$T_a = 2T_1 \int_0^{x_1} \alpha_1 e^{-2\int_0^x \alpha dx'} dx + 2T_2 \int_{x_1}^{x_2} \alpha_2 e^{-2\int_0^x \alpha dx'} dx +$$

$$2T_3 \int_{x_2}^{x_3} \alpha_1 e^{-2\int_0^x \alpha dx'} dx$$

$$= T_1(1 - e^{-2\alpha_1 x_1}) + T_2 e^{-2\alpha_1 x_1}(1 - e^{-2\alpha_2(x_2-x_1)}) +$$

$$T_1 e^{-2\alpha_1 x_1} e^{-2\alpha_2(x_2-x_1)}(1 - e^{-2\alpha_1(x_3-x_2)})$$

(8)

Figure 5:
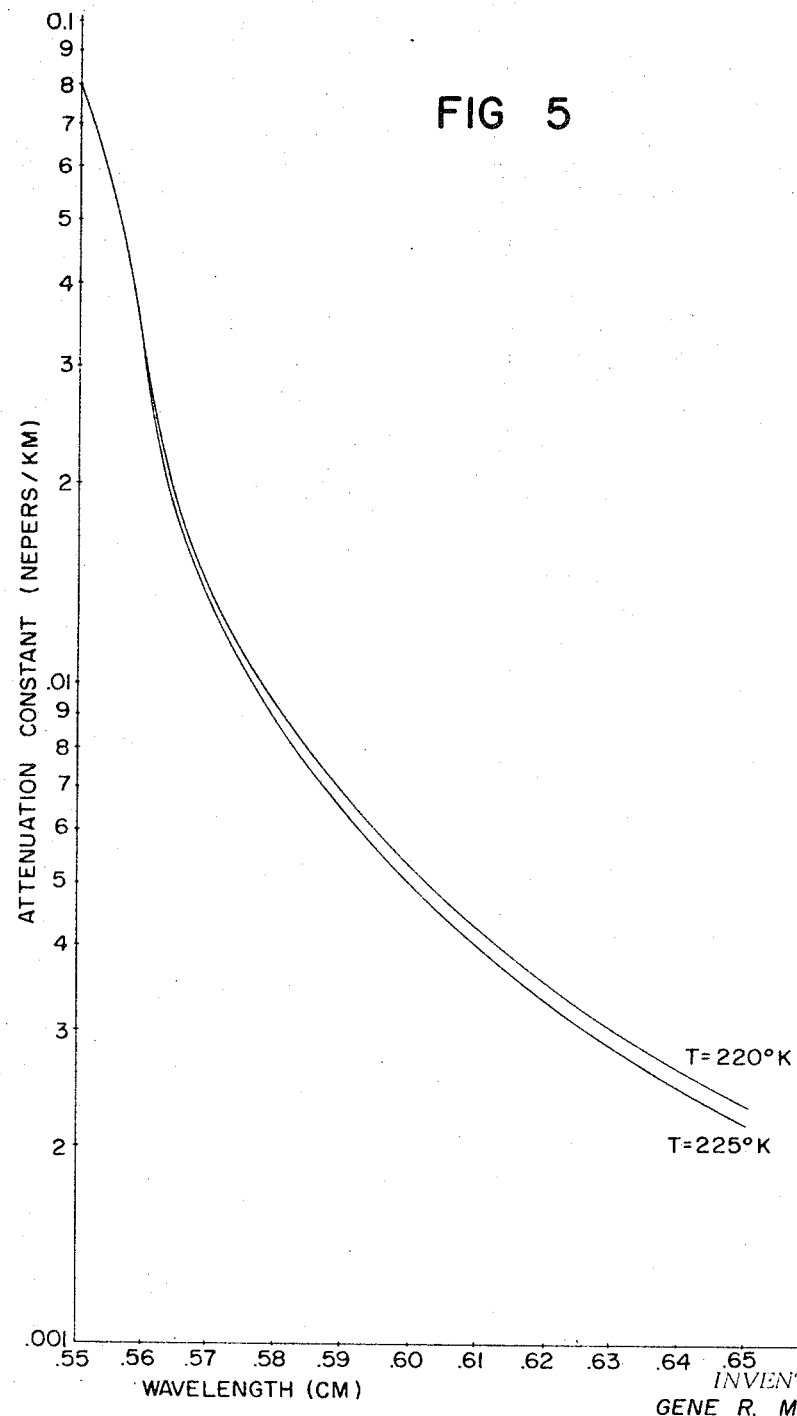
FIGURE 5 shows the variation of attenuation with wavelength for two temperatures.
Figure 6:
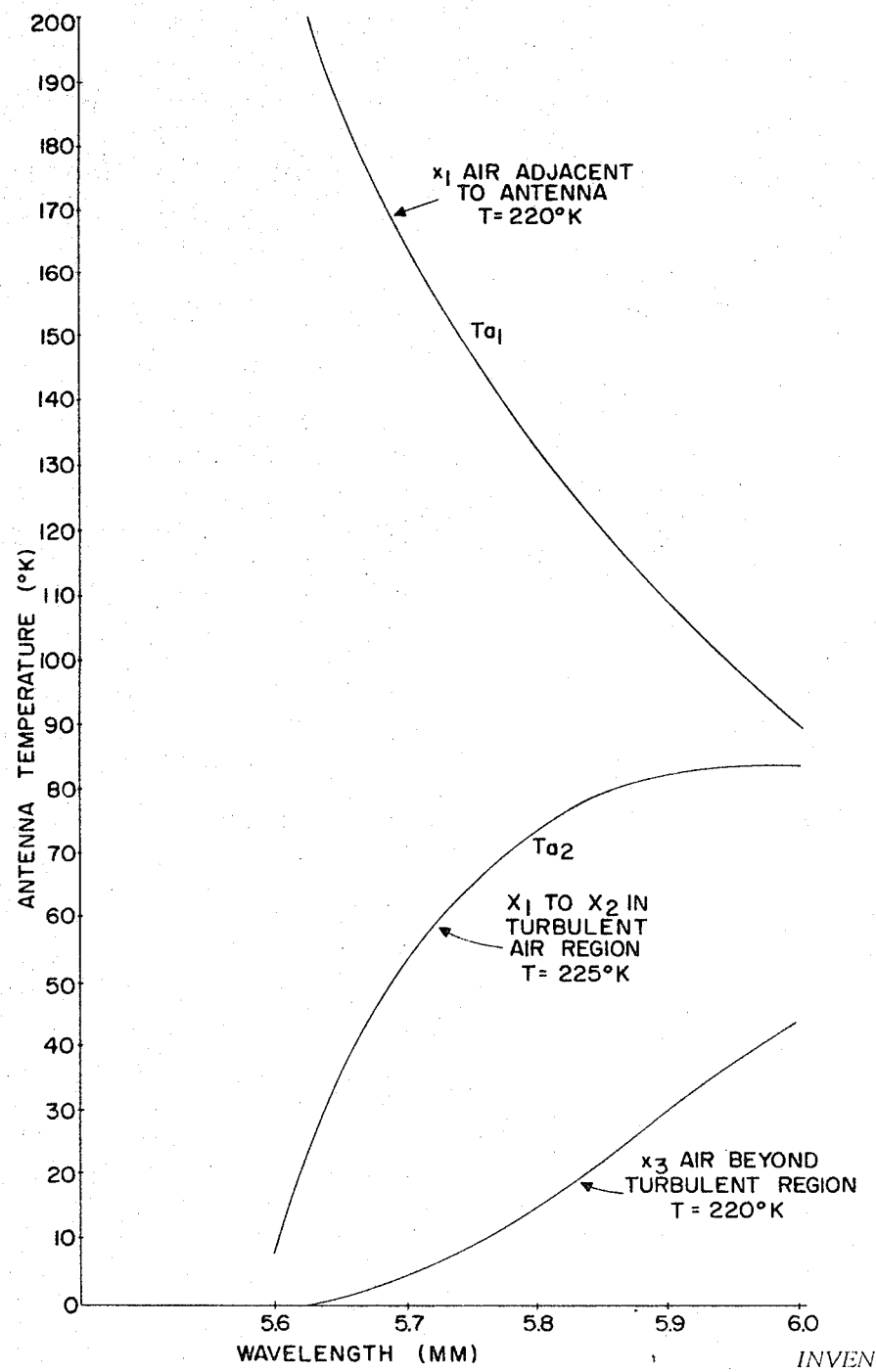
FIGURE 6 shows how the antenna temperature is affected by three distinct factors.
Figure 7:
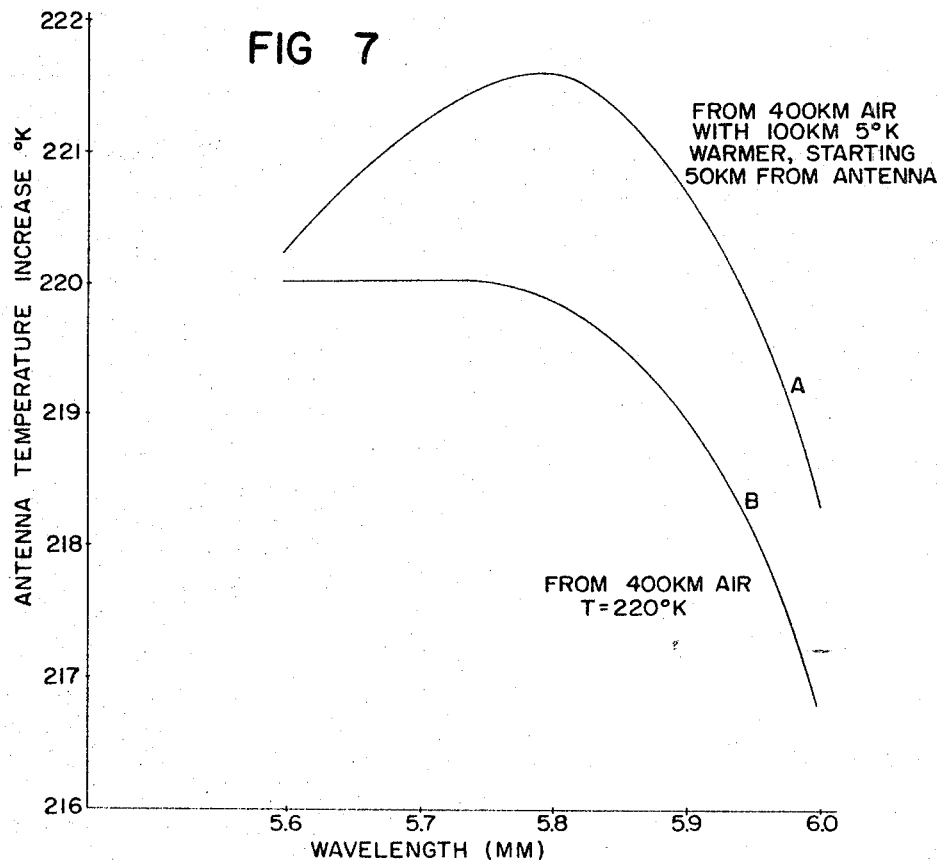
FIGURE 7 shows how the antenna temperature due to radiation varies with wavelength in two different air temperature situations.
Figures 9, 10:
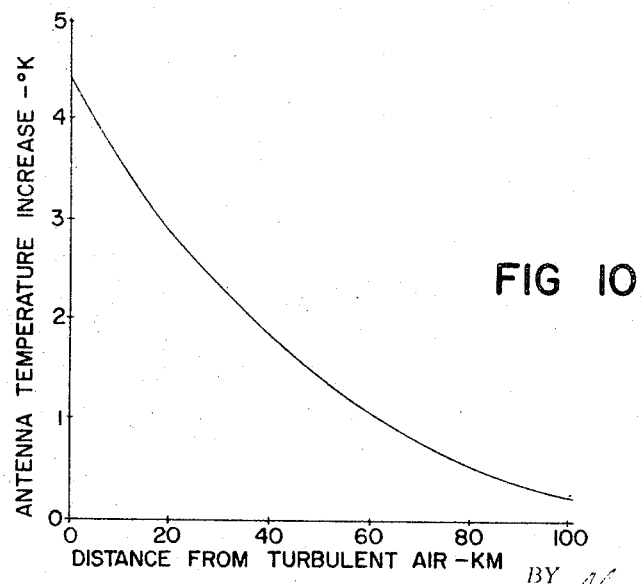
FIGURE 9 is a table showing the contribution of three air regions to the total antenna temeprature.
FIGURE 10 is a graph showing the increase of antenna temperature as the turbulent region is approached.

The basic principle of operation of a radiometric clear air turbulence detector can now be explained by reference to a specific example. First we choose the desired warning distance $x_1$. For illustration, take $x_1=50$ km., which is adequate to give passenger warning and slow to the turbulent cruising speed. Next choose the typical horizontal extent $x_2-x_1$ of the turbulent region which it is desired to detect. For the present illustration, let this be 100 km. In order to make this idealized model more realistic, a further horizontal extent $x_3-x_2$ is chosen to represent the additional finite extent of the atmosphere. This is chosen as 250 km. Now for a given pressure (altitude), there will be a wavelength which gives maximum antenna temperature response to the region of elevated temperature. To illustrate this, a pressure of 300 millibars is chosen, typical of an altitude of around 9 km. (about 30,000 feet). The average temperature of the air at this altitude is approximately 220° K. Assume the turbulent region to be 5° warmer, which is a typical value. The attenuation constant for these conditions is shown in FIGURE 5. Calculation of the antenna temperature by use of Equation 8 gives the results shown in FIGURE 9 and the graphs of FIGURES 6 and 7. The antenna temperature contributions from the air between the antenna and the beginning of the turbulent region, the turbulent region, and the air beyond are labaled $T_{a1}$, $T_{a2}$, and $T_{a3}$ respectively. These are shown separately as a function of wavelength in FIGURE 9, and are shown graphically in FIGURE 6. With reference to FIGURE 6, it is desired to minimize the contribution from the air between the antenna and the turbulent region while obtaining a good response from the turbulent region. It is also desirable to minimize the response from the region beyond because the antenna temperature is the sum of these three contributions. As shown by FIGURE 9 and also by the top curve of FIGURE 7, which is a graphical representation of the total antenna temperature as shown in FIGURE 9, the antenna temperature reaches a maximum of about 221.65° K. at about 5.82 mm. wavelength. The bottom curve of the graph shows the antenna temperature which would result from a 400 km. path length of the air if it were all at 220° K. Therefore the difference between curves A and B of FIGURE 7 is the contribution to the antenna temperature made by the turbulent region. Here we see that at wavelengths greater than about 5.8 mm. the 400 km. path is not completely opaque. A more detailed analysis considering earth curvature, refraction, and the variation of temperature and pressure with height is necessary in order to derive precise quantitative conclusions for wavelengths longer than 5.8 mm., but the curve derived in this simple example is generally illustrative of the character of the emission.

Figure 8:
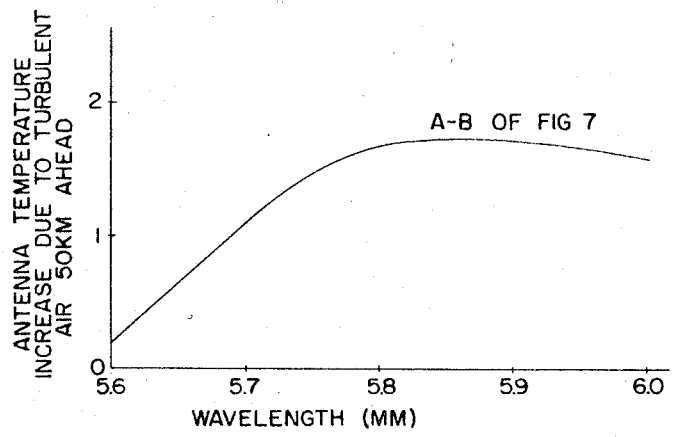
FIGURE 8 shows how the antenna temperature is increased by warmer turbulent air ahead of the antenna as a function of wavelength.

The most important indicator of system response as a function of wavelength is the difference between the two curves of FIGURE 7—the increase in total antenna temperature due to the presence of the warm air in the turbulent region. This is shown in FIGURE 8. Note that an increase in antenna temperature greater than 1.2° K. is obtained over a wide wavelength region from 5.7 mm. to more than 6.0 mm.

The foregoing calculations, although based upon an idealized model, illustrate the necessary considerations in the development of a practical detection instrument. For example, the RMS value of the output fluctuations of a square wave modulated Dicke radiometer due to the noise processes is given by $$\Delta T_a = \sqrt{2}[T_a + T_0(F-1)]/1\sqrt{\tau \Delta f} \qquad (9)$$

where $T_0$ is the ambient temperature of the receiver, F is the noise figure at that temperature, expressed as a power ratio, $\Delta f$ is the predetection bandwidth in c.p.s. and $\tau$ is the post-detection integration time in seconds. By substitution of the following exampling characteristics: $F=19.9$, $\Delta f=8\times 10^7$ c.p.s., $T_0=290°$ K. into Equation 9 it becomes:

$$\Delta T_a = 0.9/\sqrt{\tau} \,°\text{K}.$$

The choice of the optimum integration time is also important. In view of typical aircraft velocities, and the desire to observe real fluctuations in emission from the atmosphere itself, integration times in the range 5–20 seconds are desirable. If a 16-second integration time is used the RMS output noise fluctuation due to the receiver and the thermal radiation characteristic of the received signal is 0.225° K. The antenna temperature increase due to the idealized turbulent region in the above example is 1.7° K. when the instrument is 50 km. from the turbulent region if a wavelength of 5.8 mm. is used. This is about 7.6 times the radiometer output noise fluctuations, which gives a very high detection probability. It is desirable to reduce the sensitivity to the air beyond the turbulent region, therefore a wavelength somewhat shorter than that which gives a maximum response is chosen. A practical choice is about 5.75 mm. This gives an increase in antenna temperature of 1.4° K. when 50 km. from the turbulent region. A response of 6.2 times the RMS output noise fluctuation is therefore obtained. The detection probability is still quite high at this wavelength.

Assuming the choice of 5.75 mm. wavelength, the response of the clear air turbulence detector as the aircraft approaches this idealized turbulent region is shown in FIGURE 10. The antenna temperature increase due to the turbulent air becomes equal to receiver fluctuations about 100 km. from the turbulent air. It continues to increase as the turbulent air is approached, reaching a value equal to the actual physical temperature increase at the boundary of the turbulent region.

This idealized example is chosen to illustrate the nature of the response to turbulent air, and to show the method by which the wavelength is chosen. It must be recognized that detailed meteorological description of turbulent regions is still inadequate to permit a final choice of operating wavelength at this time. However, this example shows that the optimum wavelength lies in the 5–6 mm. region, and that detection ranges approximately equal to the horizontal extent of the turbulent region are possible. Exact knowledge of the wavelength is not necessary for an understanding of the invention.

This wavelength region has the further advantage that clouds which give little weather radar response have little effect upon the response.

Although this invention has been described with respect to particular embodiments thereof, it is not to be so limited, as changes and modifications may be made therein which are within the spirit and scope of the invention as defined by the appended claims.

I claim:
1. In an aircraft, a turbulent air detector system for detecting a region of clear air turbulence comprising: collector means for collecting radiation emitted a predetermined distance from said collector, radiometric receiver means tuned to receive the frequency of radiation emitted by a turbulent region and the ambient atmosphere, a short term filter means for indicating the radiation received due to a turbulent region, means for producing a signal indicative of the ambient atmosphere radiation, detector means for detecting a change of the radiation received by said receiver, and indicator means for indicating the change of radiation collected by said collector means to thereby indicate a region of clear air turbulence.

2. The system of claim 1 wherein said means for producing a signal indicative of the ambient atmosphere radiation is a long term filter.

3. The system of claim 2 wherein said detector means receives the outputs of said filters.

4. The system of claim 1 wherein said means for producing a signal indicative of the ambient atmosphere radiation is a reference source.

5. The system of claim 4 and further including means for mixing the output of said filter means and said source.

6. A turbulent air detector system for detecting the frequency difference between electromagnetic radiation inherently emitted by a region of turbulence and the frequency of electromagnetic radiation emitted by the ambient atmosphere comprising: antenna means for collecting radiation from said region and the ambient atmosphere a predetermined distance from said antenna means, a radiometric receiver tuned to receive said radiation from said region and the ambient atmosphere and actuated by said antenna means, and a parallel combination of a long time filter and a short time filter, said combination being actuated by said receiver, mixing means for receiving the output of said parallel combination and yielding a differential output, and indicator means being actuated by said differential output so that a change of radiation upon said antenna means influences said indicator and thereby detects the presence of said turbulent region.

7. The system of claim 6 wherein said receiver is responsive to radiation having a wavelength of approximately 5 to 6 millimeters.

8. A system for detecting electromagnetic radiation inherently emitted by a region of clear turbulence comprising: antenna means for collecting radiation from said region and the ambient atmosphere, a radiometric receiver tuned to receive said radiation from said reigon and the ambient atmosphere and actuated by said antenna means, a reference source, mixing means actuated by said receiver and said source, the output of said mixing means being the difference of said receiver output and said reference source, and indicator means for receiving the output of said mixing means so that a change of radiation received by said receiver influences said indicator and thereby reflects the presence of a clear air turbulent region.

9. The system claim 8 wherein said receiver is responsive to radiation having a wavelength of approximately 5 to 6 millimeters.

10. A method of detecting clear air turbulence comprising the seteps of: collecting radiation emitted by the atmosphere lying a predetermined distance in front of a radiation collecting means, obtaining a first indication of the radiation present in the ambient atmosphere, obtaining a second indication of the radiation emitted by a clear air turbulence region, and comparing said first and second indications.

11. A method of detecting clear air turbulence comprising the steps of: collecting radiation emitted by the atmosphere lying a predetermined distance in front of a radiation collecting means, passing the collected radiation through a receiver means, supplying a reference signal which is indicative of the radiation present in the ambient atmosphere, comparing the output of said receiver with said reference signal, and detecting the results of the comparison, said comparison showing the presence of a clear air turbulent region when the receiver output is different from the reference signal.

12. The method of detecting clear air turbulence as defined by claim 10 wherein said first indication is obtained by filtering said collected radiation in a long time filter and said second indication is obtained by filtering said collected radiation in a short time filter.

13. The method of detecting clear air turbulence as defined by claim 10 wherein said first indication is obtained from a reference source.

References Cited

UNITED STATES PATENTS

| | | | |
|---|---|---|---|
| 2,879,382 | 3/1959 | Freen | 325—67 |
| 3,325,644 | 6/1967 | Frye | 250—83.3 |
| 3,344,277 | 9/1967 | Smith | 250—83.3 XR |
| 3,359,557 | 12/1967 | Fow et al. | 343—100 |
| 3,402,295 | 9/1968 | Astheimer | 250—83.3 |
| 3,028,596 | 4/1962 | McGillem et al. | |
| 3,129,330 | 4/1964 | Seling. | |
| 3,264,646 | 8/1966 | Gale. | |

RODNEY D. BENNETT, Jr., Primary Examiner

R. E. BERGER, Assistant Examiner

U.S. Cl. X.R.

73—170, 363; 250—83.3

UNITED STATES PATENT OFFICE

Patent No. 3,465,339                          September 2, 1969

Gene R. Marner

It is certified that error appears in the above identified patent and that said Letters Patent are hereby corrected as shown below:

Column 4, line 40, "ε" should read -- δ --; lines 58 and 59, the equation should appear as shown below:

$$\frac{P_o - P}{P_o} = 1 - e^{-2\alpha\delta x} = 2\alpha\delta x$$

Column 7, line 9, after "value" insert -- nearly --. Column 8 line 26, "seteps" should read -- steps --.

Signed and sealed this 9th day of June 1970.

(SEAL)
Attest:

EDWARD M. FLETCHER, JR.                      WILLIAM E. SCHUYLER, JR.
Attesting Officer                             Commissioner of Patents